United States Patent
Kang et al.

(10) Patent No.: US 9,287,942 B2
(45) Date of Patent: Mar. 15, 2016

(54) METHOD AND APPARATUS FOR UPLINK MULTIPLE INPUT MULTIPLE OUTPUT (MIMO) TRANSMISSION

(75) Inventors: Byeong Woo Kang, Anyang-si (KR); Dong Wook Roh, Anyang-si (KR); Dae Won Lee, Anyang-si (KR); Yu Jin Noh, Anyang-si (KR); Bong Hoe Kim, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 540 days.

(21) Appl. No.: 13/638,775

(22) PCT Filed: Apr. 27, 2011

(86) PCT No.: PCT/KR2011/003076
§ 371 (c)(1),
(2), (4) Date: Oct. 1, 2012

(87) PCT Pub. No.: WO2011/136554
PCT Pub. Date: Nov. 3, 2011

(65) Prior Publication Data
US 2013/0021898 A1 Jan. 24, 2013

Related U.S. Application Data

(60) Provisional application No. 61/328,631, filed on Apr. 27, 2010.

(51) Int. Cl.
*H04W 72/04* (2009.01)
*H04B 7/04* (2006.01)
(Continued)

(52) U.S. Cl.
CPC ............ *H04B 7/0417* (2013.01); *H04B 7/0404* (2013.01); *H04L 1/0061* (2013.01); *H04L 1/1822* (2013.01); *H04L 1/1861* (2013.01); *H04L 1/1864* (2013.01); *H04L 1/1887* (2013.01); *H04L 1/1893* (2013.01); *H04L 25/03929* (2013.01); *H04B 7/0486* (2013.01); *H04B 7/0623* (2013.01)

(58) Field of Classification Search
None
See application file for complete search history.

(56) References Cited

U.S. PATENT DOCUMENTS

2005/0219999 A1  10/2005  Kim et al.
2009/0282310 A1  11/2009  Seok et al.
(Continued)

FOREIGN PATENT DOCUMENTS

JP  2008-312209     12/2008
KR  10-2004-0063324  7/2004

*Primary Examiner* — Ayaz Sheikh
*Assistant Examiner* — Sori Aga
(74) *Attorney, Agent, or Firm* — Dentons US LLP

(57) ABSTRACT

The present description relates to a wireless communication system, and more particularly, to a method and apparatus for uplink multiple input multiple output (MIMO) transmission. A method for performing an uplink MIMO transmission according to one embodiment of the present invention comprises the following steps: transmitting, from a first subframe, a first data block and a second data block through a first HARQ process and a second HARQ process, respectively; receiving, at a second subframe, uplink scheduling control information on the first data block and control information which indicates inactivation of the second data block; setting HARQ feedback information on the second data block to an ACK state; and performing retransmission of the first data block from a third subframe on the basis of the uplink scheduling control information on the first data block. Retransmission of the second data block may not be performed until uplink scheduling control information on the second data block is received.

10 Claims, 11 Drawing Sheets

(51) Int. Cl.
*H04L 1/18* (2006.01)
*H04L 1/00* (2006.01)
*H04L 25/03* (2006.01)
*H04W 8/30* (2009.01)
*H04B 7/06* (2006.01)

(56) References Cited

U.S. PATENT DOCUMENTS

2011/0243079 A1* 10/2011 Chen et al. .................. 370/329
2011/0300854 A1* 12/2011 Shan et al. ................ 455/422.1

* cited by examiner (a)

(b)

METHOD AND APPARATUS FOR UPLINK MULTIPLE INPUT MULTIPLE OUTPUT (MIMO) TRANSMISSION

This Application is a 35 U.S.C.§371 National Stage Entry of International Application Ser. No. PCT/KR2011/003076, filed Apr. 27, 2011, and claims the benefit of U.S. Provisional Application No. 61/328,631, filed Apr. 27, 2010, all of which are incorporated by reference in their entirety herein.

TECHNICAL FIELD

The present description relates to wireless communication and more specifically, to a method and apparatus for uplink multiple input multiple output (MIMO) transmission.

BACKGROUND ART

While the 3GPP LTE standard (e.g., 3GPP LTE release 8 or 9) supports uplink transmission from a user equipment (UE) through a single transmit antenna, the 3GPP LTE-A standard discusses support of uplink transmission (uplink MIMO transmission) from a UE through a plurality of transmit antennas in order to increase uplink transmission throughput.

Multi-antenna transmission is also called Multiple Input Multiple Output (MIMO). MIMO can increase the efficiency of data transmission and reception using multiple transmit antennas and multiple receive antennas. MIMO schemes include spatial multiplexing, transmit diversity, beamforming, etc. A MIMO channel matrix formed according to the number of receive antennas and the number of transmit antennas can be decomposed of a plurality of independent channels and each independent channel is called a layer or stream. The number of layers or streams or a spatial multiplexing rate is called a rank. In UL MIMO transmission, transmission can be performed through a plurality of layers and the same data or different data (i.e., codeword or transport block) can be transmitted through each layer.

For an independent codeword transmitted on uplink, a receiving side (e.g., eNB) can check whether the codeword has an error through cyclic redundancy check (CRC) and generate acknowledgement (ACK) information. A reception state may be represented as 'ACK' when no error is generated and may be represented as 'NACK' when an error is generated. The receiving side transmits the generated ACK information to a transmitting side (e.g., UE) such that the transmitting side can perform hybrid automatic repeat request (HARQ) transmission. According to HARQ transmission, the transmitting side retransmits data previously transmitted thereto when receiving a NACK signal from the receiving side and the receiving side combines previously received data and the retransmitted data to improve retransmission performance.

DISCLOSURE

Technical Problem

Conventional systems require only uplink scheduling information and/or ACK information for a single piece of uplink data (or a codeword or transport block) because only uplink transmission through a single antenna has been defined. However, it is necessary to define new uplink scheduling information and a new ACK scheme with the introduction of uplink MIMO transmission.

An object of the present invention is to provide a method for performing efficient and correct transmission and retransmission for uplink multi-codeword transmission. Specifically, an object of the present invention is to provide an uplink transmission method when an uplink rank is restricted after multi-codeword multi-rank transmission.

The technical problems solved by the present invention are not limited to the above technical problems and those skilled in the art may understand other technical problems from the following description.

Technical Solution

According to one aspect of the present invention, a method for performing MIMO transmission includes: transmitting a first data block and a second data block at a first subframe through a first HARQ process and a second HARQ process, respectively; receiving, at a second subframe, uplink scheduling control information on the first data block and control information which indicates disabling of the second data block; setting HARQ feedback information on the second data block to an ACK state; and performing retransmission of the first data block at a third subframe on the basis of the uplink scheduling control information on the first data block, wherein retransmission of the second data block is not performed until uplink scheduling control information on the second data block is received.

According to another aspect of the present invention, a UE for performing uplink MIMO transmission includes: a physical layer module including a reception module for receiving uplink scheduling control information from an eNB and a transmission module for performing initial transmission or retransmission of a first data block and a second data block; and a medium access control (MAC) layer module including a plurality of HARQ processes including a HARQ entity, a first HARQ process and a second HARQ process which are managed by the HARQ entity, wherein the MAC layer module is configured to control the transmission module to transmit the first data block and the second data block at a first subframe through the first HARQ process and the second HARQ process, respectively, and to control the transmission module to perform retransmission of the first data block at a third subframe on the basis of uplink scheduling control information on the first data block when the uplink scheduling control information on the first data block is received at a second subframe through the reception module, wherein the physical layer module transmits an acknowledgement (ACK) signal for the second data block to the MAC layer module when control information which indicates disabling of the second data block is received at the second subframe, wherein the MAC layer module sets HARQ feedback information on the second data block to an ACK state and controls retransmission of the second data block not to be performed until uplink scheduling control information on the second data block is received.

The following may be commonly applied to the aspects of the present invention.

When the uplink scheduling control information on the second data block is not received at the second subframe, retransmission of the second data block may be performed when the HARQ feedback information on the second data block corresponds to NACK if a HARQ buffer corresponding to the second HARQ process is not empty.

A new data indicator (NDI) of the uplink scheduling control information on the first data block received at the second subframe may have a value that is not toggled as compared to previous transmission of the first HARQ process.

Uplink scheduling control information on the second data block may be received after the third subframe, and retransmission of the second data block may be performed on the basis of the uplink scheduling control information on the second data block.

The uplink scheduling control information on the first data block and the uplink scheduling control information on the second data blocks may be received through physical downlink control channels (PDCCHs), and the first and second data blocks may be transmitted through physical uplink shared channels (PUSCHs).

The second subframe may come after four subframes from the first subframe and the third subframe may come after four subframes from the second subframe.

The technical problems solved by the present invention are not limited to the above technical problems and those skilled in the art may understand other technical problems from the following description.

Advantageous Effects

According to embodiment of the present invention, it is possible to prevent waste of resources and unnecessary transmission of downlink control information and to successfully perform uplink transmission without erroneous operations when an uplink rank is restricted after uplink multi-codeword multi-rank transmission.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Figure 1:
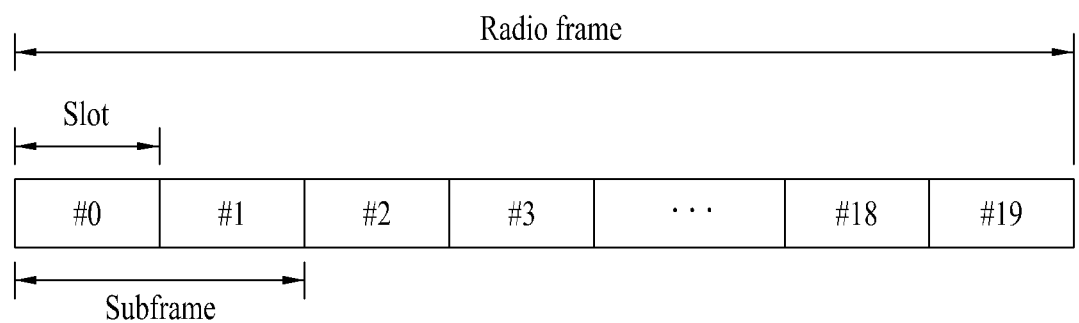
FIG. 1 illustrates an exemplary radio frame structure used in a 3GPP LTE system.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (Wireless-MAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

FIG. 1 illustrates a radio frame structure in the 3GPP LTE system. A radio frame is divided into 10 subframes. Each subframe is further divided into two slots in the time domain. A unit time during which one subframe is transmitted is defined as Transmission Time Interval (TTI). For example, one subframe may be 1 ms in duration and one slot may be 0.5 ms in duration. A slot may include a plurality of Orthogonal Frequency Division Multiplexing (OFDM) symbols in the time domain. Because the 3GPP LTE system adopts OFDMA for downlink, an OFDM symbol represents one symbol period. A symbol may be referred to as an SC-FDMA symbol or symbol period on the uplink. A Resource Block (RB) is a resource allocation unit including a plurality of contiguous subcarriers in a slot. This radio frame structure is purely exemplary and thus the number of subframes in a radio frame, the number of slots in a subframe, or the number of OFDM symbols in a slot may vary.

Figure 2:
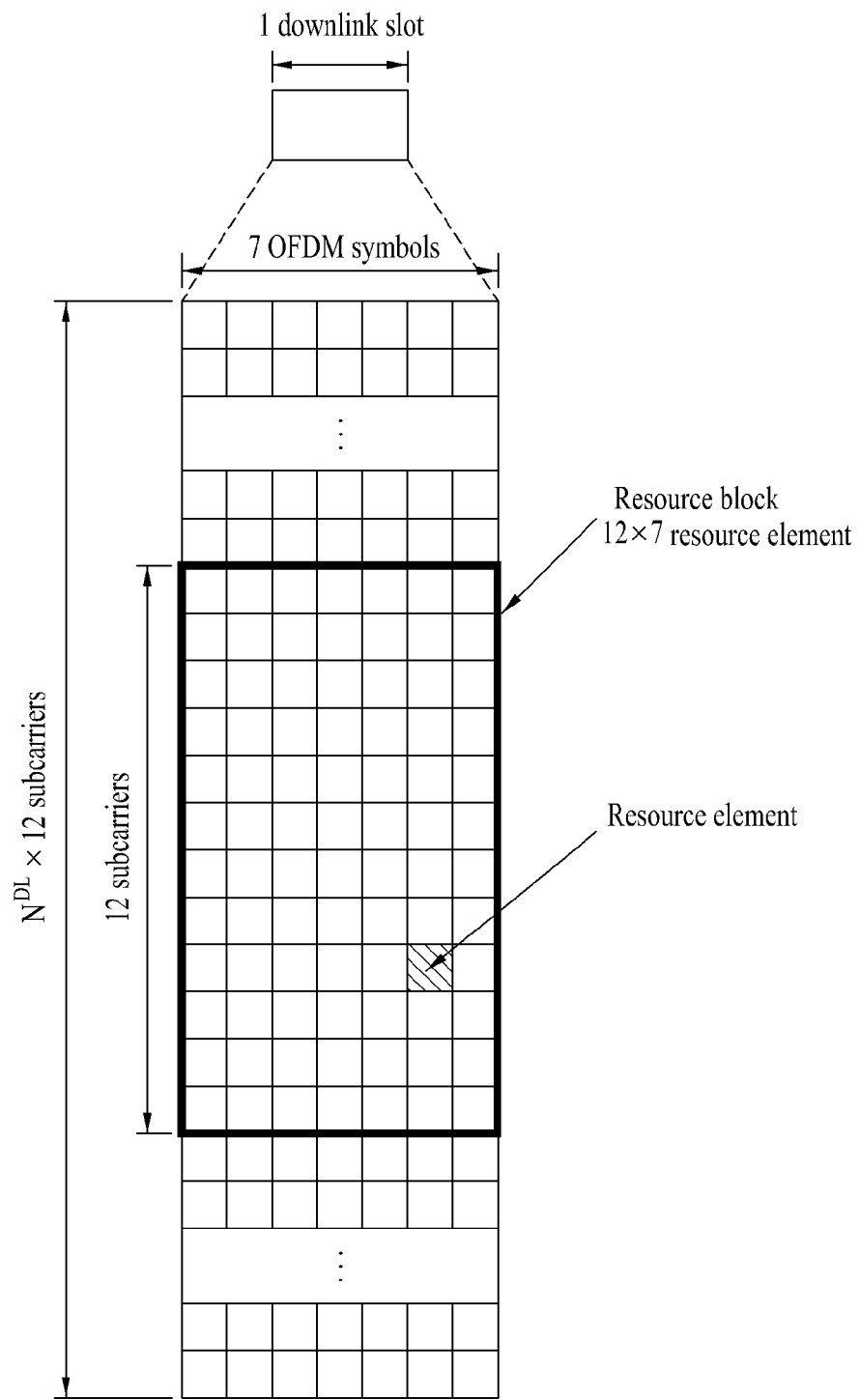
FIG. 2 illustrates a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot includes 7 OFDM symbols in case of a normal Cyclic Prefix (CP), whereas a downlink slot includes 6 OFDM symbols in case of an extended CP. Each element of the resource grid is referred to as a Resource Element (RE). An RB includes 12×7 REs. The number of RBs in a downlink slot, $N^{DL}$ depends on a downlink transmission bandwidth. An uplink slot may have the same structure as a downlink slot.

Figure 3:
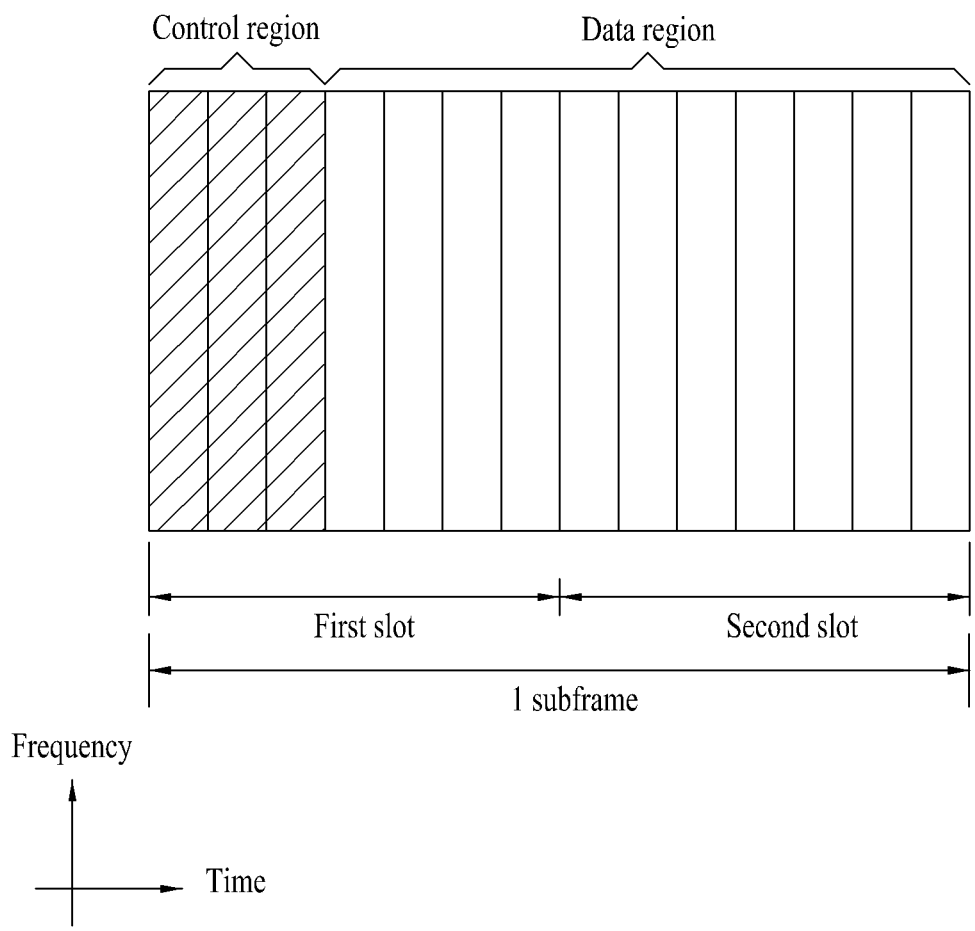
FIG. 3 illustrates a downlink subframe structure.

FIG. 3 illustrates a downlink subframe structure. Up to three OFDM symbols at the start of the first slot in a downlink subframe are used for a control region to which control channels are allocated and the other OFDM symbols of the downlink subframe are used for a data region to which a Physical Downlink Shared Channel (PDSCH) is allocated. Downlink control channels used in the 3GPP LTE system include a Physical Control Format Indicator Channel (PCFICH), a Physical Downlink Control Channel (PDCCH), and a Physical Hybrid automatic repeat request (ARQ) Indicator Channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups.

The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE includes a set of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
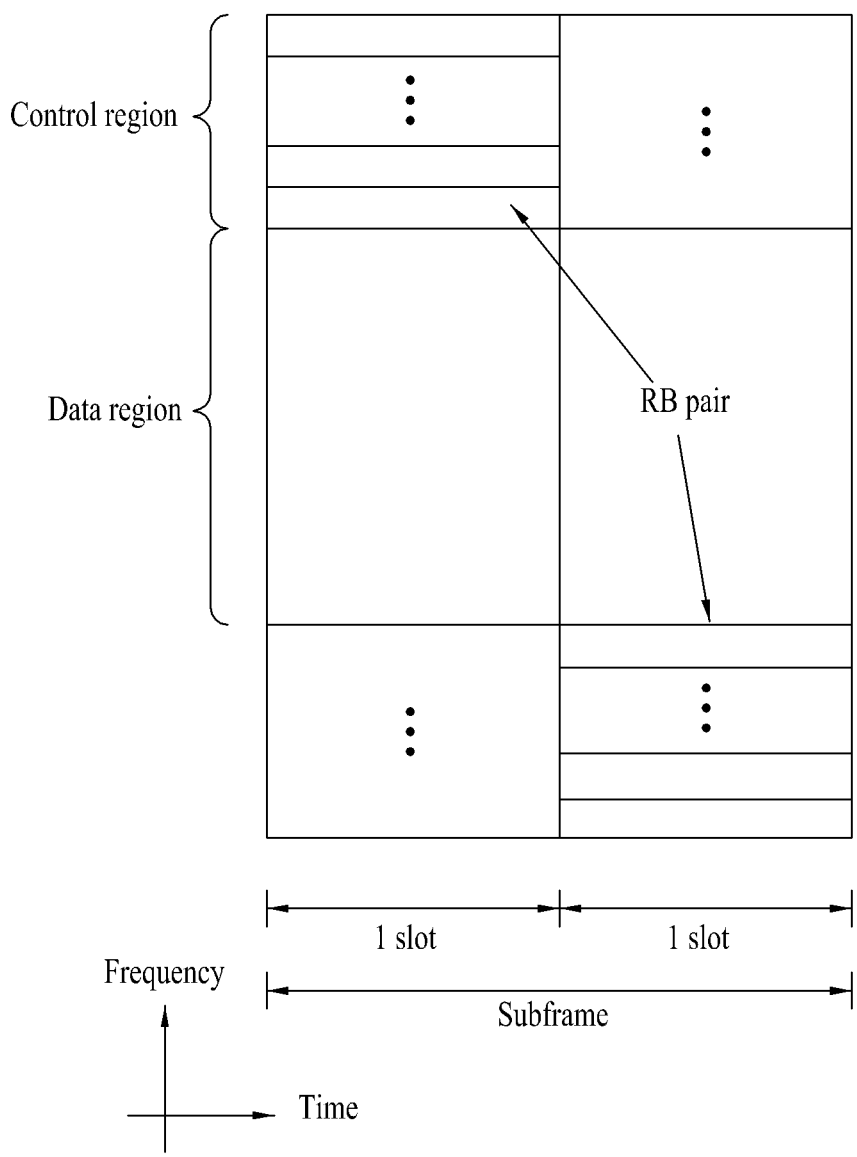
FIG. 4 illustrates an uplink subframe structure.

FIG. 4 illustrates an uplink subframe structure. An uplink subframe may be divided into a control region and a data region in the frequency domain. A Physical Uplink Control Channel (PUCCH) carrying uplink control information is allocated to the control region and a Physical Uplink Shared Channel (PUSCH) carrying user data is allocated to the data region. To maintain single-carrier characteristics, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

MIMO System

MIMO does not depend on a single antenna path to receive a whole message. Rather, it completes the message by combining data fragments received through a plurality of antennas. Because MIMO can increase data rate within a certain area or extend system coverage at a given data rate, it is considered as a promising future-generation mobile communication technology that may find its use in a wide range including mobile terminals, relays, etc. MIMO can overcome a limited transmission capacity caused by increased data communication.

MIMO schemes can be categorized into spatial multiplexing and spatial diversity depending on whether the same data is transmitted or not. In spatial multiplexing, different data is transmitted simultaneously through a plurality of Tx antennas. As a transmitter transmits different data through different Tx antennas and a receiver distinguishes the transmission data by appropriate interference cancellation and signal processing, a transmission rate can be increased by as much as the number of transmission antennas. Spatial diversity is a scheme that achieves transmit diversity by transmitting the same data through a plurality of Tx antennas. Space time channel coding is an example of spatial diversity. Since the same data is transmitted through a plurality of Tx antennas, spatial diversity can maximize a transmission diversity gain (a performance gain). However, spatial diversity does not increase transmission rate. Rather, it increases transmission reliability using a diversity gain. These two schemes may offer their benefits when they are appropriately used in combination. In addition, MIMO schemes may be categorized into open-loop MIMO (or channel-independent MIMO) and closed-loop MIMO (or channel-dependent MIMO) depending on whether a receiver feeds back channel information to a transmitter.

Figure 5:
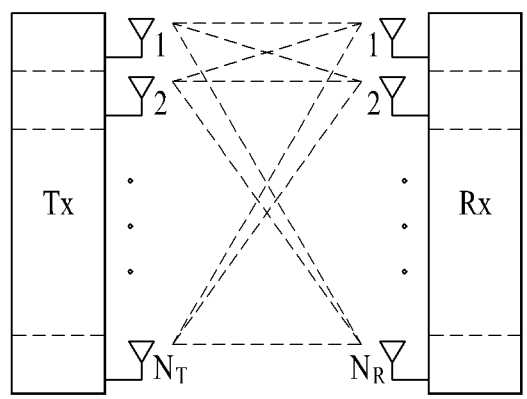
FIG. 5 illustrates a MIMO scheme.
Figure 5:
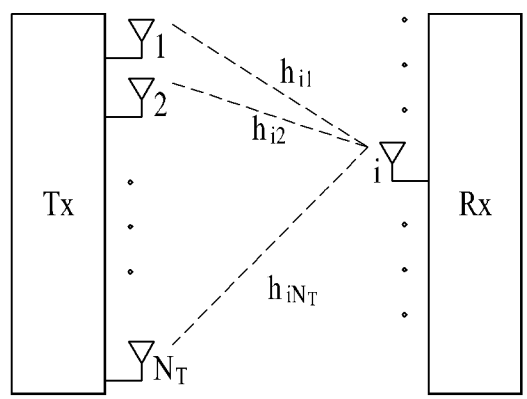

FIG. 5 illustrates the configuration of a typical MIMO communication system. Referring to FIG. 5(a), when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \qquad \text{[Equation 1]}$$

For instance, a MIMO communication system with 4 Tx antennas and 4 Rx antennas may achieve a four-fold increase in transmission rate theoretically, relative to a single-antenna system.

Communication in a MIMO system will be described in detail through mathematical modeling. As illustrated in FIG. 5(a), it is assumed that $N_T$ Tx antennas and $N_R$ Rx antennas exist. Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[equation 2]}$$

A different transmission power may be applied to each piece of transmission information, $S_1, S_2, \ldots, S_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [Ps_1, Ps_2, \ldots, Ps_{N_T}]^T \qquad \text{[equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5. Herein, $W_{ij}$ denotes a weight between an $i^{th}$ Tx antenna and a $j^{th}$ piece of information. W is called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{12} & w_{12} & \ldots & w_{2N_T} \\ \vdots & & \ddots & \\ w_{i2} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \qquad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

The channels may be represented as vectors and matrices by grouping them. The vector representation of channels may be carried out in the following manner. FIG. 13(b) illustrates channels from $N_T$ Tx antennas to an $i^{th}$ Rx antenna.

As illustrated in FIG. 5(b), channels from the $N_T$ Tx antennas to an $i^{th}$ Rx antenna may be expressed as $$h_i^T = [h_{i1}, h_{i2}, \ldots, h_{iN_T}] \qquad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & & \ddots \\ h_{N_R 1} & h_{N_R 2} & \ldots & h_{N_R N_T} \end{bmatrix} \qquad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \qquad \text{[Equation 9]}$$

From the above modeled equations, the received signal is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \qquad \text{[Equation 10]}$$

$$\begin{bmatrix} n_1 \\ n_2 \\ \vdots \\ n_i \\ \vdots \\ n_{N_R} \end{bmatrix} = Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$. In general, the rank of a matrix is defined as the smaller between the numbers of independent rows and columns. Accordingly, the rank of the matrix is not larger than the number of rows or columns. For example, the rank of the matrix H, rank(H) is limited as follows.

$$\text{rank}(H) \leq \min(N_T, N_R) \qquad \text{[Equation 11]}$$

As described before, an evolved wireless communication system may adopt uplink MIMO transmission in order to increase uplink transmission throughput. As an uplink MIMO transmission scheme, a multi-transmission stream or multi-transmission layer transmission scheme may be used for a single UE for the purpose of spatial multiplexing. This is called SU-MIMO. In uplink SU-MIMO, link adaptation may be applied to each individual transmission stream or transmission stream group. Different Modulation and Coding Schemes (MCSs) may be used for link adaptation. For this purpose, Multiple CodeWord (MCW)-based transmission may be performed on uplink.

In an MCW MIMO scheme, for example, up to two CodeWords (CWs) may be transmitted simultaneously. For the MIMO transmission, information about an MCS used in a transmitter, a New Data Indicator (NDI) indicating whether transmitted data is new data or retransmission data, and a Redundancy Version (RV) indicating a transmitted sub-packet in case of retransmission is needed. An MCS, NDI, and RV may be defined for each Transport Block (TB).

A plurality of TBs may be mapped to a plurality of CWs according to a transport block-to-codeword mapping rule. For example, let two RBs be denoted by TB1 and TB2 and let two CWs be denoted by CW0 and CW1 (or CW1 and CW2). When the two TBs TB1 and TB2 are enabled (or activated), the first and second TBs TB1 and TB2 may be mapped respectively to the first and second CWs CW0 and CW1. Or the first TB TB1 may be mapped to the second CW CW1 and the second TB TB2 may be mapped to the first CW CW0 according to the value of a transport block-to-codeword swap flag. If one of the two TBs is enabled (or activated) and the other TB is disabled (or inactivated), the enableded TB may be mapped to the first CW CW0. That is, a one-to-one mapping relationship is placed between TBs and CWs. TB disabling covers the case where size of a TB is 0. When the size of a TB is 0, the TB is not mapped to a CW.

Figure 6:
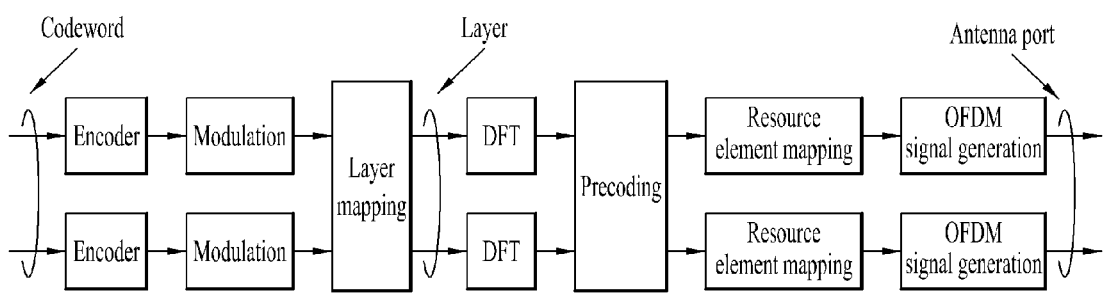
FIG. 6 is a block diagram of a configuration for uplink multi-codeword based SU-MIMO transmission.

FIG. 6 is a block diagram of an uplink MCW SU-MIMO transmission structure.

After encoding in encoders, one or more CWs may be scrambled with a UE-specific scrambling signal. The scrambled CWs are modulated to complex symbols in Binary Phase Shift Keying (BPSK), Quadrature Phase Shift Keying (QPSK), 16-ary Quadrature Amplitude Modulation (16QAM), or 64-ary QAM (64QAM) according to the type of a transmission signal and/or a channel state. The modulated complex symbols are mapped to one or more layers. In case of signal transmission through a single antenna, one CW is mapped to one layer and then transmitted. In contrast, in case of signal transmission through multiple antennas, a codeword-to-layer mapping relationship may be established according to a transmission scheme as illustrated in [Table 1] and [Table 2].

TABLE 1

| Number of layers | Number of code words | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ | $M_{symb}^{layer} = M_{symb}^{(0)} = M_{symb}^{(1)}$ |
|  |  | $x^{(1)}(i) = d^{(1)}(i)$ |  |
| 2 | 1 | $x^{(0)}(i) = d^{(0)}(2i)$ | $M_{symb}^{layer} = M_{symb}^{(0)}/2$ |
|  |  | $x^{(1)}(i) = d^{(0)}(2i + 1)$ |  |
| 3 | 2 | $x^{(0)}(i) = d^{(0)}(i)$ | $M_{symb}^{layer} = M_{symb}^{(0)} = M_{symb}^{(1)}/2$ |
|  |  | $x^{(1)}(i) = d^{(1)}(2i)$ |  |
|  |  | $x^{(2)}(i) = d^{(1)}(2i + 1)$ |  |
| 4 | 2 | $x^{(0)}(i) = d^{(0)}(2i)$ | $M_{symb}^{layer} = M_{symb}^{(0)}/2 = M_{symb}^{(1)}/2$ |
|  |  | $x^{(1)}(i) = d^{(0)}(2i + 1)$ |  |
|  |  | $x^{(2)}(i) = d^{(1)}(2i)$ |  |
|  |  | $x^{(3)}(i) = d^{(1)}(2i + 1)$ |  |

TABLE 2

| Number of layers | Number of code words | Codeword-to-layer mapping $i = 0, 1, \ldots, M_{symb}^{layer} - 1$ | |
|---|---|---|---|
| 2 | 1 | $x^{(0)}(i) = d^{(0)}(2i)$ | $M_{symb}^{layer} = M_{symb}^{(0)}/2$ |
|  |  | $x^{(1)}(i) = d^{(0)}(2i + 1)$ |  |
| 4 | 1 | $x^{(0)}(i) = d^{(0)}(4i)$ | $M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$ | |
|  |  | $x^{(1)}(i) = d^{(0)}(4i + 1)$ |  |
|  |  | $x^{(2)}(i) = d^{(0)}(4i + 2)$ |  |
|  |  | $x^{(3)}(i) = d^{(0)}(4i + 3)$ |  |

If $M_{symb}^{(0)} \bmod 4 \neq 0$ two null symbols shall be appended to $d^{(0)}(M_{symb}^{(0)} - 1)$

[Table 1] illustrates an example of transmitting a signal in spatial multiplexing and [Table 2] illustrates an example of transmitting a signal in transmit diversity. In [Table 1] and [Table 2], $x^{(a)}(i)$ denotes an $i^{th}$ symbol of a layer with index a and $d^{(a)}(i)$ denotes an $i^{th}$ symbol of a CW with index a. A mapping relationship between the number of CWs and the number of layers used for transmission may be known from "Number of layers" and "Number of codewords" in [Table 1] and [Table 2]. "Codeword-to-Layer mapping" indicates how the symbols of each CW are mapped to a layer.

As noted from [Table 1] and [Table 2], although one CW may be mapped to one layer on a symbol basis prior to transmission, one CW may be distributed to up to 4 layers as in the second case of [Table 2]. When one CW is distributed to a plurality of layers in this manner, the symbols of each CW are mapped sequentially to layers. On the other hand, in case of single CW transmission, a single encoder and a single modulation block exist.

The layer-mapped signals may be subject to Discrete Fourier Transform (DFT). In addition, the layer-mapped signals may be multiplied by a specific precoding matrix selected according to a channel state and then assigned to Tx antennas. To avoid an increase in PAPR (or CM) of an uplink transmission from a UE, precoding may be performed in the frequency domain after DFT in the DFT-s-OFDMA structure.

The antenna-specific transmission signals may be mapped to time-frequency REs for transmission and transmitted through the antennas after being processed in OFDM signal generators.

Figure 7:
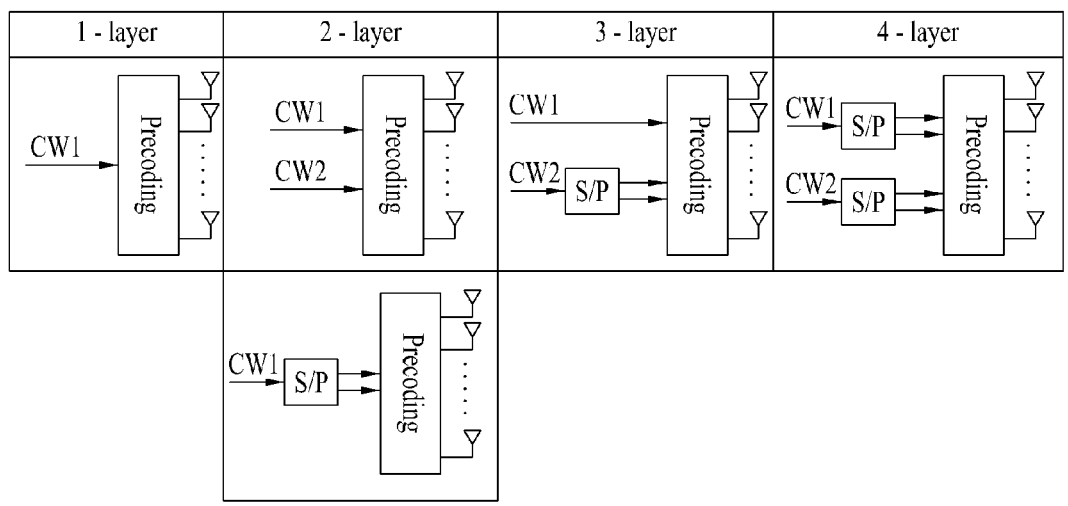
FIG. 7 illustrates codeword-to-layer mapping relationships.

FIG. 7 illustrates a codeword-to-layer mapping relationship. In FIG. 7, S/P denotes a serial/parallel converter which can be implemented according to [Table 1] and [Table 2].

In case of 1-layer, one CW CW2 is mapped to one layer. One layer may be allocated to each Tx antenna after being subjected to precoding.

In case of 2-layer, two CWs CW1 and CW2 may be respectively mapped to layers and up to two layers may be respectively allocated to Tx antennas after being subjected to precoding.

Furthermore, in case of 2-layer, one CW CW1 may be mapped to two layers. These two layers may be respectively allocated to Tx antennas after being subjected to precoding. This can be applied to the case in which two CWs are initially transmitted and only one of the two CW2 is retransmitted.

In case of 3-layer, one CW CW1 may be mapped to one layer (first layer), another CW CW2 may be mapped to two layers (second layer and third layer), and up to three layers may be respectively allocated to Tx antennas after being subjected to precoding.

In case of 4-layer, one CW CW1 may be mapped to two layers (first and second layers), another CW CW2 may be mapped to two layers, and up to four layers may be respectively allocated to Tx antennas after being subjected to precoding.

Uplink Scheduling Control Information

Control information for uplink MCW MIMO transmission is described. Uplink scheduling control information corresponds to downlink control information (DCI) transmitted on a PDCCH, and various DCI formats can be defined according to usage of DCI.

The legacy 3GPP LTE standard (e.g. 3GPP LTE Release-8) defines a single-antenna port transmission mode for uplink transmission and defines DCI format 0 to support the single-antenna port transmission mode. DCI format 0 may include 'Flag for format 0/format 1A differentiation', 'Hopping flag', 'Resource block allocation (for contiguous allocation) and hopping resource allocation', 'MCS and redundancy version', 'NDI', 'TPC command for scheduled PUSCH', 'Cyclic shift for DMRS', 'uplink (UL) index (only for TDD)', 'downlink (DL) assignment index (only for TDD)' and 'CQI request'. Contiguous resource allocation and single-antenna transmission may be supported using DCI format 0.

Meanwhile, non-contiguous resource allocation and uplink spatial multiplexing transmission using up to 4 transmission layers may be introduced to 3GPP LTE-A uplink transmission. To support this new uplink transmission scheme, it is necessary to define a new transmission mode and a new DCI format for control signaling of the new transmission mode.

Considering uplink SU-MIMO spatial multiplexing, a closed-loop spatial multiplexing transmission mode using multiple TBs may be newly defined as uplink transmission modes. In the multi-TB closed-loop spatial multiplexing transmission mode, transmission of up to two TBs from a scheduled UE may be considered. Each individual TB may have an MCS level. To support dynamic rank adaptation, two MCS indicators for the two TBs may be included in uplink scheduling control information (a DCI format). In addition, precoding information for all transmission ranks may be included in the control information.

Control information which may be included in a DCI format (e.g. DCI format 4 discriminated from the conventional DCI formats) for the uplink multi-TB MIMO transmission is described.

In uplink SU-MIMO transmission, a channel carrying each CW is independent. For example, channel environments in which CWs are transmitted may be very different due to imbalance between transmit antennas and antenna gains. Therefore, independent 'MCS and RV' and 'NDI' fields may be defined for each CW for uplink SU-MIMO transmission. The 'MCS and RV' and 'NDI' fields for the first CW may be 5 bits and 1 bit long, respectively, as in the conventional DCI format 0. Like those of the first CW, the 'MCS and RV' and 'NDI' fields for the second CW may be 5 bits and 1 bit long, respectively.

To support transmission of one of two TBs when one CW is mapped to one layer or one CW is mapped to two layers, it is necessary to indicate whether the TB is enabled. In order to represent the state of a disabled TB in uplink SU-MIMO transmission, some states defined in an MCS table may be redefined or a state which indicates the disabled TB may be added to the MCS table. For example, if MCS index #0 and the number of physical RBs are larger than 1 or MCS index #28 and the number of physical RBs are equal to 1, a corresponding TB is indicated as being disabled.

A field which indicates the number of precoding information and layers to be applied to uplink MIMO transmission may be included in a new DCI format. For example, a UE having two antenna ports can use a 3-bit precoding codebook for uplink spatial multiplexing and a UE having four antenna ports can use a 6-bit precoding codebook for uplink spatial multiplexing. In case of transmission using two antenna ports, 1-layer transmission and a precoder index used for 1-layer transmission may be indicated when one CW is enabled and 2-layer transmission and a precoder index used for 2-layer transmission may be indicated ports when two CWs are enabled. In case of transmission using four antenna ports, 1-layer transmission or 2-layer transmission and a precoder index used therefor may be indicated when one CW is enabled and 2-layer transmission, 3-layer transmission or 4-layer transmission and a precoder index used therefor may be indicated ports when two CWs are enabled.

Similarly to the conventional uplink scheduling control information DCI format 0, the new DCI format for scheduling control information to uplink multi-TB MIMO transmission may include 'Resource block allocation and hopping resource allocation', 'TPC command for scheduled PUSCH', 'Cyclic shift for DMRS', 'UL index (for TDD)', 'DL assignment index (for TDD)' and 'CQI request'.

HARQ Process

Figure 8:
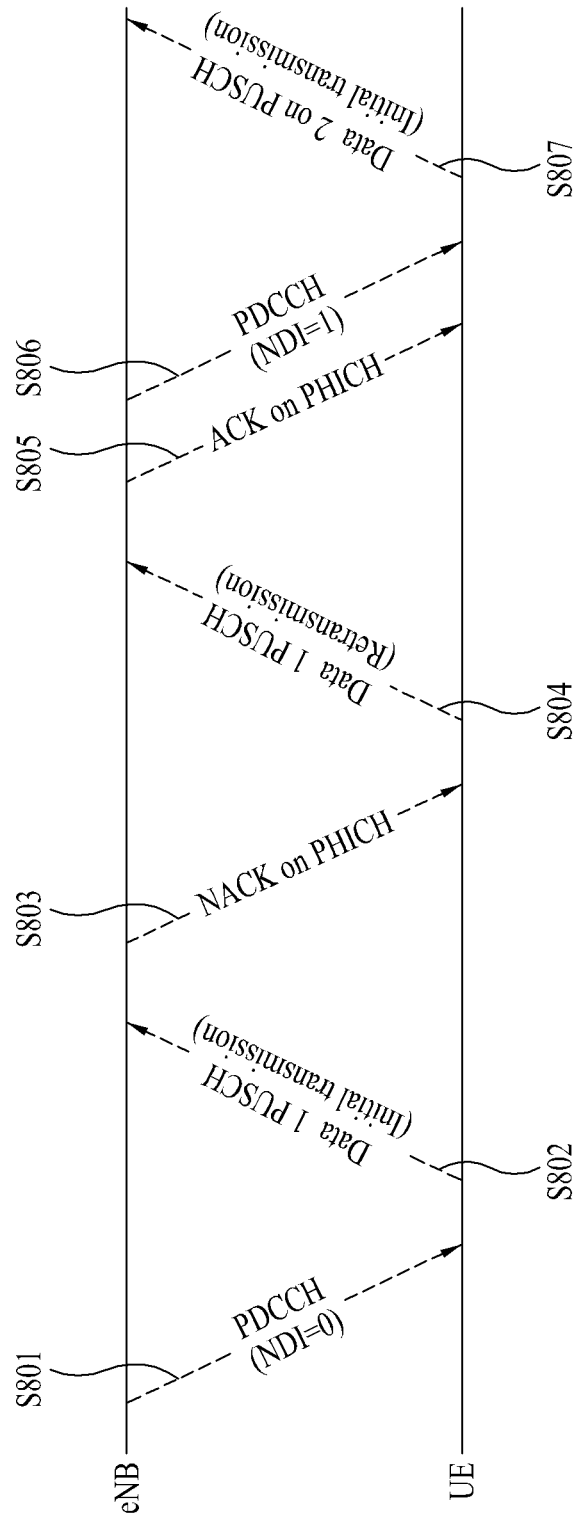
FIG. 8 illustrates an uplink HARQ process.

A description will be given of a hybrid automatic repeat and request (HARQ) process for uplink (UL) single codeword transmission with reference to FIG. 8.

An eNB may transmit UL grant information or UL scheduling information to a UE through a PDCCH such that the UE can transmit data to the eNB according to the HARQ scheme (S801). In general, the UL scheduling information may include a UE indicator (C-RNTI or semi-persistent scheduling C-RNTI), information (resource block assignment) on a radio resource to be allocated to a UE indicated by the UE indicator, transmission parameters (modulation coding scheme (MCS) and redundancy version (RV)), a new data indicator (NDI), etc.

A medium access control (MAC) layer of the UE includes a HARQ entity that manages a HARQ process. The HARQ entity may manage a plurality of HARQ processes (e.g., eight HARQ processes).

The plurality of HARQ processes can operate in a synchronous manner. That is, the HARQ processes can be respectively allocated to TTIs in a synchronous manner. For example, if eight HARQ processes are present, the HARQ processes can be sequentially allocated to TTIs according to data reception time in such a manner that HARQ processes #1 to #8 are respectively used in TTI 1 to TTI 8, HARQ process #1 is used in TTI 9, and HARQ process #2 is used in TTI 10. In addition, the plurality of HARQ processes may have independent HARQ buffers. A synchronous HARQ process may have a fixed round trip time (RTT). For example, the synchronous HARQ process can have a fixed retransmission period corresponding to 8 TTIs (8 ms).

Since the HARQ processes are allocated synchronously as described above, if the HARQ entity receives a PDCCH for UL initial transmission of specific data, the HARQ entity can manage the HARQ processes such that a HARQ process related to a TTI at which the data is received can transmit the data. For example, if the UE receives a PDCCH including UL scheduling information at an N-th TTI, the UE can transmit data at an (N+4)th TTI. In other words, HARQ process #K allocated to the (N+4)th TTI can be used to transmit the data. The UE can check UL scheduling information transmitted thereto by monitoring a PDCCH on which UL scheduling information is transmitted at every TTI, and then transmit data to the eNB according to the UL scheduling information through a PUSCH (S802).

The UE can generate data in the form of a MAC protocol data unit (PDU) according to the UL scheduling information, store the MAC PDU in a HARQ buffer and transmit the MAC PDU to the eNB at transmission time. Then, the UE can wait for HARQ feedback for transmission of the MAC PDU from the eNB.

Upon reception of the data from the UE, the eNB stores the data in a soft buffer and attempt to decode the received data. The eNB can generate an ACK signal upon successfully decoding the received data and generate a NACK signal when failing to decode the received data. The eNB can transmit the generated ACK/NACK signal to the UE. A downlink channel on which HARQ ACK/NACK information for UL transmission is transmitted is a physical HARQ indicator channel (PHICH). FIG. 8 shows an example in which the eNB transmits the NACK signal since the eNB fails to decode the data (S803).

If the HARQ NACK signal for the MAC PDU is transmitted from the eNB, the UE can retransmit the same MAC PDU stored in the HARQ buffer in the same format or in a new format at a designated time (S804). That is, if the UE receives the HARQ NACK signal at the N-th TTI, the UE can retransmit the MAC PDU stored in the HARQ buffer of the corresponding process at the (N+4)th TTI. Conversely, if the UE receives the ACK signal from the eNB, the UE can determine that the data has been successfully transmitted to the eNB, transmit the next data, and interrupt HARQ retransmission of the data. The UE does not flush the HARQ buffer even if the UE receives the ACK signal from the eNB.

HARQ retransmission of the UE may be performed in a non-adaptive manner. According to non-adaptive HARQ retransmission, the UE can retransmit data using the same UL scheduling information as that of the first transmission at a TTI to which the next HARQ process is allocated. That is, the UE can use the resource block (RB), MCS and transmission mode used in previous transmission for retransmission without changing the same. That is, while initial transmission of specific data can be performed only when a PDCCH including UL scheduling information (UL grant) is received, retransmission of the specific data can be carried out even if the PDCCH (UL grant) is not received. Accordingly, when synchronous and non-adaptive HARQ processes are applied, the eNB may not transmit a UL grant PDCCH for retransmission.

HARQ retransmission of the UE may be performed in an adaptive manner. In this case, a transmission parameter for retransmission is received through a PDCCH. UL scheduling information included in the PDCCH may differ from UL scheduling information for initial transmission according to channel status. For example, the UL scheduling information can indicate transmission at a high bit rate if channel state is superior to that of initial transmission and indicate transmission at a bit rate lower than that of initial transmission in a poor channel state.

If the UE receives the UL scheduling information, the UE can recognize whether the current data is initially transmitted data or retransmitted previous data from the NDI field included in the PDCCH on which the UL scheduling information is transmitted. The NDI field is a 1-bit field which is toggled to $0 \rightarrow 1 \rightarrow 0 \rightarrow 1 \rightarrow 0$ . . . whenever new data is transmitted. The NDI field has the same value as that of initial transmission for retransmission. That is, the UE can be aware of whether data is retransmitted by comparing the NDI field with the previous value to check if the NDI field is equal to the previous value.

The UE keeps data of the corresponding HARQ buffer if the NDI value of the UL scheduling information (UL grant) transmitted from the eNB is not toggled from the value of previous transmission of the corresponding HARQ process, whereas the UE flushes the HARQ buffer when the NDI value is toggled.

Furthermore, the UE increases the number of transmissions, CURRENT_TX_NB, by 1 whenever data is transmitted according to the HARQ scheme and flushes the MAC PDU stored in the HARQ buffer when the number of transmissions, CURRENT_TX_NB, reaches a maximum number of transmissions, set by a higher layer.

Upon reception of the retransmitted data, the eNB may combine the retransmitted data with the data that was not successfully decoded and stored in the soft buffer in various manners and attempt to decode the combined data. The eNB may transmit an ACK signal when the data is successfully decoded and transmit a NACK signal when the data is not successfully decoded. The eNB can repeat a procedure of sending a NACK signal and receiving retransmitted data until data is successfully decoded. In the example of FIG. 8, the eNB can combine the data retransmitted in step S804 with the data previously received and stored and attempt to decode the data. When the eNB successfully decodes the received data, the eNB can transmit an ACK signal to the UE through the PHICH (S805). In addition, the eNB can transmit UL scheduling information for next data transmission through the PDCCH. The eNB can toggle the NDI of the UL scheduling information to 1 and transmit the UL scheduling information in order to signal that the UL scheduling information is used for transmission of new data rather than for adaptive retransmission (S806). Accordingly, the UE can transmit new data to the eNB through a PUSCH corresponding to the received UL scheduling information (S807).

The aforementioned UL HARQ transmission scheme in the 3GPP LTE system may be regarded as a basic UL HARQ transmission scheme in the 3GPP LTE-A system. However, since the conventional UL HARQ scheme relates to single codeword based transmission, the conventional HARQ scheme cannot be applied to multi-codeword based transmission.

As described above, when the UE performs multi-codeword based SI-MIMO transmission on UL, the eNB can perform channel decoding for each individual codeword and then check whether individual codeword decoding error is generated through CRC. Accordingly, the eNB can generate ACK/NACK information for each individual codeword. If UL SU-MIMO transmission based on two codewords is applied when the rank (the number of transport layers or transport streams) is greater than 1, ACK/NACK information on each codeword may be transmitted through a separate PHICH resource.

A description will be given of a method of transmitting each codeword when initial transmission is performed at a rank greater than 1 and the rank is restricted (e.g., designated as rank 1) for retransmission in UL multi-codeword based SU-MIMO transmission.

For example, when the UE receives a NACK signal from the eNB and performs retransmission after UL 2-codeward transmission (rank 2 or higher), both a HARQ response and a UL grant for one of two codewords may not be provided while a HARQ response and/or a UL grant for the other codeword is received. That is, although a codeword is present in a HARQ buffer, any control information that causes UL transmission for the codeword may not be provided. In this case, it is necessary to clearly define how UL transmission for the codeword is performed.

Figure 9:
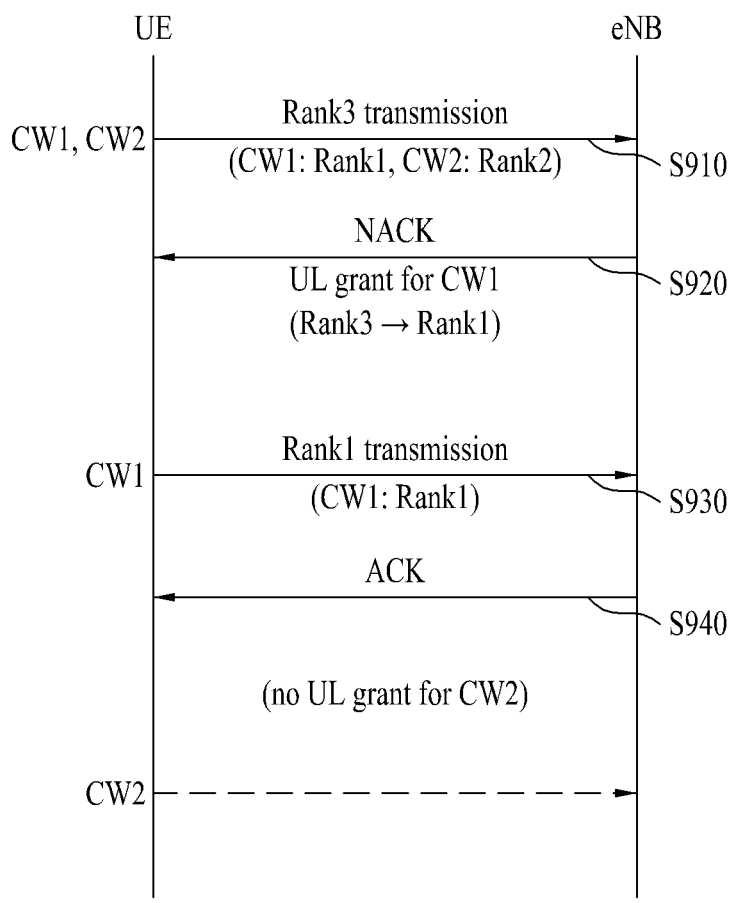
FIG. 9 illustrates a case in which a rank is restricted after uplink 2-codeword transmission.

FIG. 9 is a diagram for explaining a problem which can be generated when the rank is restricted after UL 2-codeword transmission.

The UE may transmit two codewords to the eNB (S910). Here, a first codeword CW1 may be transmitted in rank 1 and a second codeword CW2 may be transmitted in rank 2. That is, CW1 and CW2 can be transmitted in rank 3, and UL transmission scheduling information on CW1 and CW2 can be provided from the eNB through the PDCCH DCI format. For example, if a UL grant that indicates UL transmission of step S910 is transmitted at an n-th subframe (subframe n) through a PDCCH, the timing of step S910 may correspond to subframe n+4. Specifically, the UE can receive two UL grants at subframe n from the eNB and transmit UL data at subframe n+4 through a PUSCH.

The eNB may decode the two codewords received in step S910 and transmit a decoding result to the UE through a PHICH in step S920. Here, HARQ ACK information (HARQ feedback information) on each codeword can be transmitted through a discriminated PHICH.

In addition, the eNB may indicate a UL channel rank value reduced from that of previous transmission. For example, the eNB can indicate the rank value as 1 through a UL grant. In the present description, it is assumed that the UL channel rank is reduced to rank 1 from rank 3 corresponding to the rank of previous transmission. Information on the UL channel rank can be indicated by 'precoding information and layer number' field of the DCI format, for example. The eNB can transmit a UL grant DCI format for CW1 to the UE through a PDCCH according to the reduced rank.

When the eNB transmits only the UL grant for CW1, the UE does not transmit (or retransmit) CW2 even if the UE receives HARQ feedback for CW2. That is, since the eNB schedules transmission of CW1 of the UE through the UL grant in step S920, only the HARQ feedback information on CW1 is associated with a subsequent operation of the UE and HARQ feedback information on CW2 does not determine the subsequent operation of the UE. It is assumed that the HARQ feedback information on CW1 is NACK. That is, it is assumed that the HARQ feedback information on CW1 and the HARQ feedback information on CW2 are NACK and NACK or NACK and ACK. To enable the UE to retransmit CW1 which has not been successfully decoded by the eNB (i.e. indicated as NACK), the NDI field of UL grant DCI format for CW1 can be set to a value that is not toggled from the value of previous transmission in step S920. The timing of step S920 may correspond to subframe n+8.

Upon reception of the HARQ feedback information through the PHICH and reception of the UL grant through the PDCCH, the UE can perform UL transmission in step S930. According to the UL grant of step S920, the UE can perform retransmission (i.e. adaptive retransmission) of CW1 in rank 1. The timing of step S930 may correspond to subframe n+12.

Upon successful decoding of CW1 retransmitted in step S930, the eNB can transmit HARQ feedback information (i.e. ACK) on CW1 to the UE through the PHICH in step S940. The timing of step S940 may correspond to subframe n+16.

CW1 can be successfully transmitted through steps S910 to S940. In the aforementioned process, while CW2 is still kept in the HARQ buffer after initial transmission (S910) (the UE does not flush the HARQ buffer even if the UE receives an ACK signal for CW2 in step S920, as described above), the eNB does not provide any control information that indicates transmission/retransmission of CW2. Accordingly, the operation of the UE of transmitting CW2 is ambiguous. That is, it has not been determined whether the UE should transmit CW2 on the basis of the same information as scheduling information (the UL grant received at the subframe n in the above description) about initial transmission of CW2 or on the basis of the same information as latest UL scheduling information (UL grant received at subframe n+8 (S920) in the above description) although the latest UL scheduling information relates to CW1. Furthermore, there is a problem that the current channel is not suitable for transmission of CW2. That is, if the current channel according to the latest UL grant is indicated as being suitable for rank 1 transmission while CW2 is initially transmitted in rank 2, a scheme for transmitting CW2 without a new UL grant for CW2 transmission is not determined. Accordingly, the UE cannot determine when and how CW2 in the HARQ buffer will be transmitted. Embodiments of the present invention for solving the above-described ambiguity will now be described.

Embodiment 1

The present embodiment relates to a scheme by which an eNB provides a new UL grant for an disabled CW and a UE waits on reception of the UL grant. For this operation, if CW1 is enabled and CW2 is disabled after transmission of the two CWs, for example, it is necessary to define operation of the UE of recognizing disabling of CW2. While the following description is given on the basis of codewords, descriptions based on codewords can be equally applied to descriptions based on transport blocks because a single codeword is mapped to a single transport block. For clarity of description, embodiments of the present invention will be described based on codewords.

Figure 10:
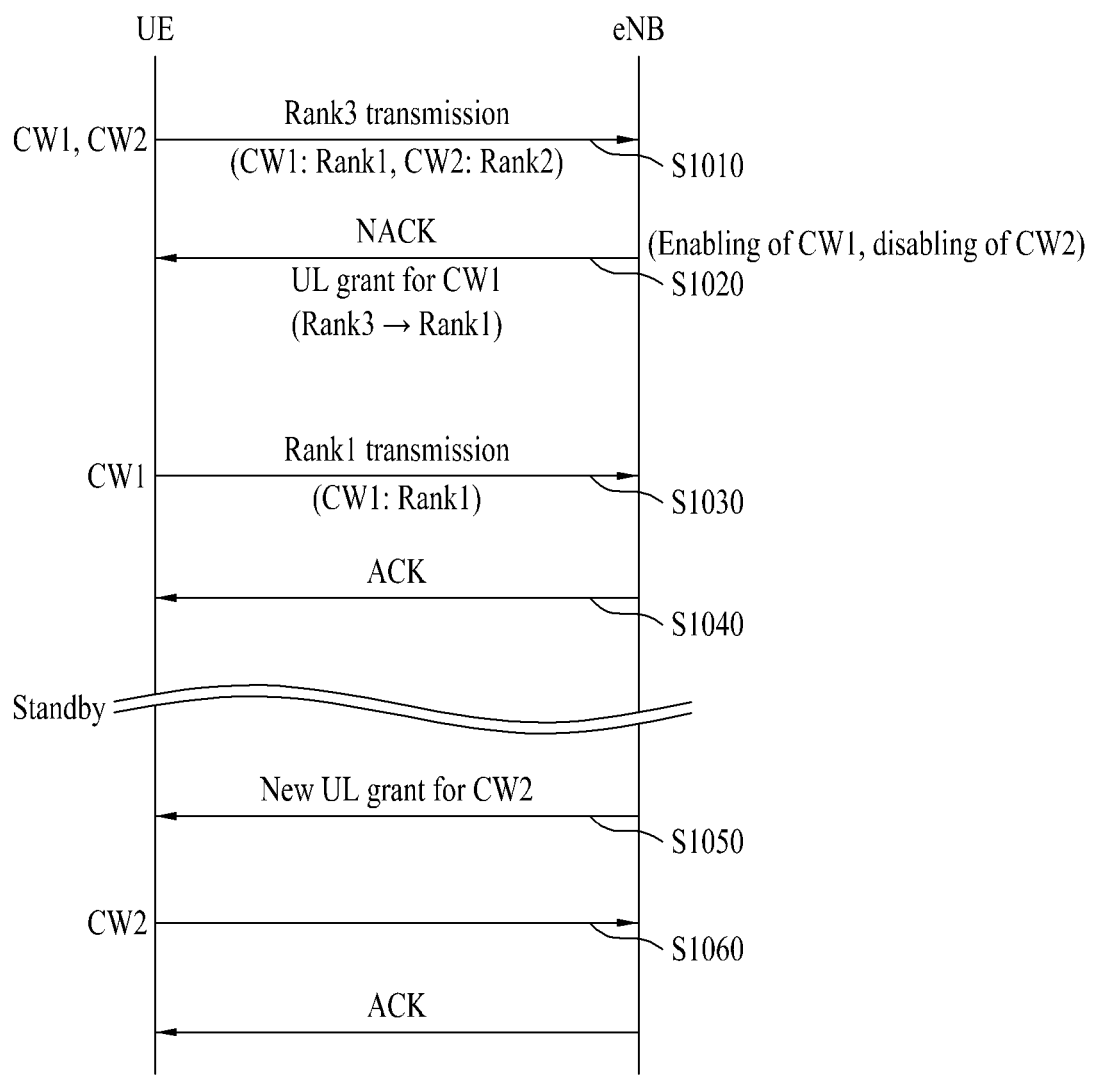
FIG. 10 illustrates an uplink multi-codeword transmission method according to an embodiment of the present invention.

FIG. 10 illustrates a UL multi-codeword transmission method according to the present embodiment of the invention.

The UE may transmit two CWs to the eNB in step S1010. The first CW (CW1) may be transmitted in rank 1 and the second CW (CW2) may be transmitted in rank 2. That is, CW1 and CW2 can be transmitted in rank 3, and UL transmission scheduling information about transmission of CW1 and CW2 can be provided from the eNB through a PDCCH DCI format before step S1010. For example, if a UL grant that indicates UL transmission of step S1010 is transmitted at subframe n through a PDCCH, the timing of step S1010 may correspond to subframe n+4. That is, the UE can receive two UL grants from the eNB at subframe n and transmit CW1 and CW2 at subframe n+4 through a PUSCH.

Specifically, a higher layer (e.g., MAC layer) can receive two UL grants (a single UL grant per HARQ process) associated with a TTI (corresponding to subframe n+4) at subframe n from a lower layer (e.g., physical layer) and transmit the received UL grants and related HARQ information to a HARQ entity of the TTI. A UL grant may be present per CW and two UL grants are provided for UL transmission of two CWs. The HARQ entity can identify two HARQ processes associated with the TTI and determine whether a UL grant for each HARQ process is for new transmission. That is, the HARQ entity can determine whether an NDI included in the corresponding UL grant has been toggled as compared to previous transmission of the corresponding HARQ process. When the UL grant is for new transmission, the HARQ entity may acquire a MAC PDU, transmit the MAC PDU with the UL grant and HARQ information to the identified HARQ process and instruct the identified HARQ process to perform new transmission. The HARQ process stores the MAC PDU in a HARQ buffer when the HARQ entity instructs the HARQ process to perform new transmission. In addition, the HARQ process can set a state of internal HARQ feedback information (e.g., a value designated as HARQ_FEEDBACK) of the UE to a NACK state because HARQ feedback information about the corresponding CW is not present due to new transmission. Furthermore, the HARQ process can instruct the physical layer to perform transmission based on MCS, RV, etc. indicated by the UL grants. Accordingly, UL transmission of the two CWs at subframe n+4 can be performed and MAC PDUs respectively corresponding to the two CWs can be stored in HARQ buffers.

The eNB may decode the two CWs received in step S1010 and transmit the decoding result to the UE through a PHICH in step S1020. If step S1010 is performed at subframe n+4, step S1020 may be carried out at subframe n+8. In this case, HARQ feedback information about the respective CWs may be transmitted through PHICH resources discriminated from each other.

The eNB may signal, to the UE, a UL channel rank value which has been reduced as compared to previous transmission. For example, the eNB can indicate a rank value of 1 through a UL grant. In the present embodiment, it is assumed that the UL channel rank is reduced to rank 1 from rank 3 of previous transmission. Information about the UL channel rank can be indicated through 'number of pieces of precoding information and layers' field of the DCI format, for example.

The eNB can signal enabling of CW1 and disabling of CW2 to the UE. Information about enabling/disabling of a CW may be indicated through the 'MCS and RV' field of the DCI format, for example. That is, the eNB can signal enabling of only CW1 and a UL grant DCI format indicating rank 1 transmission to the UE through a PDCCH. However, the present invention is not limited thereto, and the UL grants in step S1020 may include rank information representing reduction from rank 3 to rank 2 and signal disabling of CW1 and enabling of CW2. While CW1 is enabled and CW2 is disabled in the following description, the present invention is not limited thereto and the principle of the present invention can be equally applied to a case in which enabling of one of two CWs is signaled after transmission of the two CWs.

It is assumed that the UE receives HARQ feedback information corresponding to NACK for CW1 whose enabling is indicated through the UL grant from the eNB through the PHICH in step S1020. The UE transmits the NACK information about CW1 to the higher layer and performs UL retransmission on the basis of the UL grant for CW1. Retransmission of CW1 is performed in step S1030. Step S1030 may be carried out at subframe n+12 if step S1020 is performed at subframe n+8.

Specifically, the higher layer (e.g., MAC layer) can receive a single UL grant associated with a TTI (corresponding to subframe n+12) at subframe n+8 from the lower layer (e.g., physical layer). Here, the single UL grant is for the enabled CW1 and a UL grant for the disabled CW2 is not present. The MAC layer can transmit the received UL grant and related HARQ information to a HARQ entity of the TTI.

The HARQ entity can identify a HARQ process associated with the TTI and determine whether the UL grant for the identified HARQ process corresponds to new transmission or retransmission. Since it is assumed that the eNB does not successfully decode CW1 in initial transmission (step S1010) of CW1, an NDI included in the UL grant for CW1 is set to a value that is not toggled as compared to previous transmission of the corresponding HARQ process. Accordingly, the HARQ entity can transmit the UL grant and HARQ information (e.g., redundancy version) to the identified HARQ process and instruct the identified HARQ process to perform adaptive retransmission, according to the UL grant that signals retransmission of CW1.

The HARQ process can set HARQ feedback information (e.g., a value designated as HARQ_FEEDBACK) to a NACK state when instructed by the HARQ entity to perform adaptive retransmission. In this case, the HARQ feedback information state is equal to the HARQ feedback information state set for CW1 through the PHICH in step S1020 (if only the UL grant is transmitted since there is no HARQ feedback information through the PHICH in step S1020, the UE can set the HARQ feedback information to a NACK state to eliminate ambiguity). In addition, the HARQ process can instruct the physical layer to perform retransmission based on information such as RV indicated by the UL grant. Accordingly, adaptive retransmission of CW1 at subframe n+12 can be performed (S1030).

The eNB may successfully decode CW1 retransmitted in step S1030 and transmit an ACK signal for CW1 as a decoding result through a PHICH in step S1040. The UE does not perform initial transmission/retransmission of CW1 because the ACK signal for CW1 is received and a UL grant that indicates new transmission of CW1 is not provided. The UE does not immediately empty the HARQ buffer corresponding to CW1 even if the ACK signal for CW1 is received.

For CW2 disabled according to instruction through the UL grant in step S1020, the UE can set HARQ feedback information (e.g., a value designated as HARQ_FEEDBACK) to an ACK state. That is, the UE can set the HARQ feedback information about CW2 to the ACK state regardless of HARQ feedback information signaled through the PHICH for the disabled CW2 in step S1020 (or when HARQ feedback information about the disabled CW2 is not provided). For example, in both a case in which the HARQ feedback information about CW1 and the HARQ feedback information about CW2 are NACK and NACK and a case in which the HARQ feedback information about CW1 and the HARQ feedback information about CW2 are NACK and ACK, the UE sets the HARQ feedback information about the disabled CW2 to ACK. Otherwise, only UL grants which indicate enabling of CW1 and disabling of CW2 may be transmitted while the HARQ feedback information about the disabled CW2 is not provided in step S1020. In this case, the UE also sets the HARQ feedback information about the disabled CW2 to ACK. Accordingly, the UE maintains the HARQ buffer for CW2.

When the UL grant for the disabled CW2 is not provided in step S1020 and the HARQ buffer of the HARQ process for CW2 is not empty, operations of the UE can be defined as follows.

If a UL grant for a HARQ process is not present, the UE checks whether a HARQ buffer of the HARQ process is empty. The UE can instruct the HARQ process to generate (i.e. prepare) non-adaptive retransmission when the HARQ buffer is not empty. Non-adaptive retransmission employs resource block allocation, MCS and transmission mode used in previous transmission for retransmission without changing the same. Non-adaptive retransmission can be set such that it is performed only when a state of HARQ feedback information about a corresponding CW (or transport block) is NACK.

A state of HARQ feedback information about an disabled CW is set to ACK by the UE according to the present invention, and thus non-adaptive retransmission of the disabled CW is not performed. Accordingly, the UE can perform initial transmission or retransmission of the disabled CW (CW2 in the present embodiment) when a new UL grant for the disabled CW is received.

In the embodiment illustrated in FIG. 10, the UE can operate to receive only the UL grant for the enabled CW1 (S1020), to transmit CW1 (S1030), to receive the ACK signal for CW1 (S1040) and to await a new UL grant for the disabled CW2 during or after processing for CW1. That is, the operation of the UE can be clearly defined as waiting for the new UL grant while maintaining the MAC PDU for the disabled CW2 in the HARQ buffer.

From a viewpoint of CW2, since the UL grant for CW2 is not provided in step S1020 and the state of the HARQ feedback information about CW2 is set to ACK according to disabling of CW2, the UE maintains data of the HARQ buffer without performing retransmission of CW2 while carrying out adaptive retransmission of CW1 in step S1030. Though the ACK signal for CW1 is received in step S1040, no control information about CW2 is provided. Accordingly, the UE does not perform retransmission of CW2 and waits while maintaining data of the HARQ buffer because the UL grant for CW2 is not present and the HARQ feedback information about CW2 is set to an ACK state.

In step S1050, the UE may receive a UL grant for CW2 for which new control information has not been provided after disabling in step S1020.

Accordingly, the UE may perform new transmission or adaptive retransmission of CW2 as instructed by the UL grant received in step S1050. The UE can perform new transmission of CW2 in step S1060 if the eNB successfully decodes CW2 initially transmitted in S1010. The UE can carry out adaptive retransmission of CW2 in step S1060 when the eNB directs enabling and retransmission of CW2 since CW2 initially transmitted in step S1010 is not successfully decoded. New transmission and retransmission schemes correspond to the above description and thus detailed explanation thereof is omitted.

In step S1070 ( 도면에 표시되어 있지 않습니다 ), the eNB may successfully decode CW2 transmitted in step S1060 and transmit an ACK signal for CW2 to the UE as a decoding result through a PHICH. Since the ACK signal for CW2 is received and a UL grant which indicates new transmission of CW2 is not present, the UE does not perform initial transmission/retransmission of CW2. Furthermore, the UE does not immediately flush the corresponding HARQ buffer even if the ACK signal for CW2 is received.

According to the present embodiment of the invention, when disabling of one of two CWs is directed after uplink 2-CW transmission, a transmission scheme for the disabled CW can be clearly defined. That is, when a CW is disabled, the UE can consider HARQ feedback information about the CW to be ACK and perform subsequent operations, and thus it is possible to prevent erroneous operation of the UE for transmission of the disabled CW without waste of resources. Accordingly, the UE can keep the CW instructed to be disabled in a memory (HARQ buffer) and wait for a UL grant for the CW. When a new UL grant is provided for the disabled CW, transmission of the disabled CW can be performed on the basis of scheduling information of the UL grant.

Embodiment 2

The present embodiment describes a scheme by which the UE retransmits an disabled CW according to a predetermined rule without waiting for a new UL grant for the disabled CW. While the following description is given on the basis of codewords, descriptions based on codewords can be equally applied to descriptions based on transport blocks because a single codeword is mapped to a single transport block. For clarity of description, embodiments of the present invention will be described based on codewords.

Figure 11:
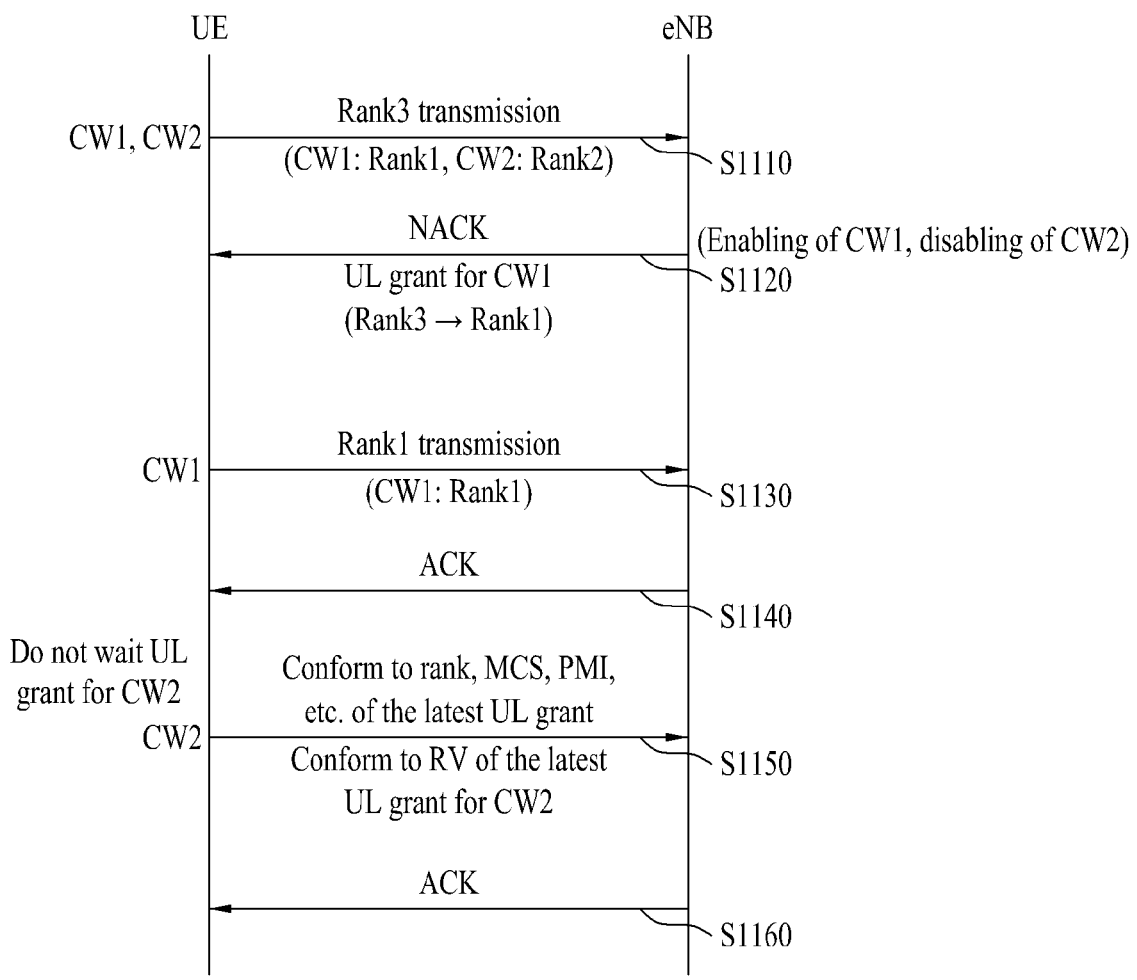
FIG. 11 illustrates an uplink multi-codeword transmission method according to another embodiment of the present invention.

FIG. 11 illustrates a UL multi-codeword transmission method according to the present embodiment of the invention.

The UE may transmit two CWs to the eNB in step S1110. The first CW (CW1) may be transmitted in rank 1 and the second CW (CW2) may be transmitted in rank 2. That is, CW1 and CW2 can be transmitted in rank 3, and UL transmission scheduling information about transmission of CW1 and CW2 can be provided from the eNB through a PDCCH DCI format before step S1110. For example, if a UL grant that indicates UL transmission of step S1110 is transmitted at subframe n through a PDCCH, the timing of step S1110 may correspond to subframe n+4. That is, the UE can receive two UL grants from the eNB at subframe n and transmit CW1 and CW2 at subframe n+4 through a PUSCH. Description of parts corresponding to those of step S1010 is omitted for clarity.

The eNB may decode the two CWs received in step S1110 and transmit the decoding result to the UE through a PHICH in step S1120. If step S1110 is performed at subframe n+4, step S1120 may be carried out at subframe n+8. In this case, HARQ feedback information about the respective CWs may be transmitted through PHICH resources discriminated from each other.

The eNB may signal, to the UE, a UL channel rank value which has been reduced as compared to previous transmission. For example, the eNB can indicate a rank value of 1 through a UL grant. In the present embodiment, it is assumed that the UL channel rank is reduced to rank 1 from rank 3 of previous transmission. Information about the UL channel rank can be indicated through 'number of pieces of precoding information and layers' field of the DCI format, for example.

The eNB can signal enabling of CW1 and disabling of CW2 to the UE. Information about enabling/disabling of a CW may be indicated through the 'MCS and RV' field of the DCI format, for example. That is, the eNB can signal enabling of only CW1 and a UL grant DCI format indicating rank 1 transmission to the UE through a PDCCH. However, the present invention is not limited thereto, and the UL grants in step S1120 may include rank information representing reduction from rank 3 to rank 2 and signal disabling of CW1 and enabling of CW2. While CW1 is enabled and CW2 is disabled in the following description, the present invention is not limited thereto and the principle of the present invention can be equally applied to a case in which enabling of one of two CWs is signaled after transmission of the two CWs.

It is assumed that the UE receives HARQ feedback information corresponding to NACK for CW1 whose enabling is indicated through the UL grant from the eNB through the PHICH in step S1120. The UE transmits the NACK information about CW1 to the higher layer and performs UL retransmission on the basis of the UL grant for CW1. Retransmission of CW1 is performed in step S1130. Step S1130 may be carried out at subframe n+12 if step S1120 is performed at subframe n+8. Retransmission of CW1 and reception of HARQ feedback information (steps S1130 and S1140) correspond to step S1030 and S1040 of FIG. 10, and thus detailed description thereof is omitted.

Upon reception of an ACK signal for CW1 in step S1140, the UE may transmit the disabled CW2. Here, the UE may be set to perform retransmission of the disabled CW2 using existing UL scheduling information without waiting for the UL grant for retransmission of the disabled CW2. In this case, retransmission of the disabled CW2 can be performed after the enabled CW1 is successfully transmitted (when the ACK signal for CW1 is received in step S1140) (S1150).

Specifically, the UE can perform retransmission of CW2 which is instructed to be disabled through the UL grant in step S1120 using UL scheduling information determined according to a predetermined rule. Here, the UE can retransmit CW2 regardless of HARQ feedback information about CW2 in step S1120. That is, when ACK or NACK is set for CW2 or HARQ feedback for CW2 is not provided in step S1120, the UE can perform retransmission of CW2 if CW2 is instructed to be disabled in step S1120. A description will be given of a method through which the UE determines the UL scheduling information for retransmission of CW2 instructed to be disabled.

Among UL grants received by the UE, the latest UL grant (UL grant of step S1120 in FIG. 11) received by the UE may be considered to include UL scheduling information most suitable for the current channel. Accordingly, as channel rank, MCS, precoding information, resource allocation information, etc. from among scheduling information used for UL transmission, information indicated by the latest uplink grant may be used. While CW2 is a CW to be retransmitted and the latest UL grant received by the UE corresponds to the UL grant for CW1, control information included in the latest UL grant received by the UE can be used since the control information is scheduling information suitable for the current uplink channel state regardless of CWs.

Retransmission of the disabled CW2 may not use all control information of the latest UL grant received by the UE. For example, it may not be desirable that RV information which determines a retransmitted subpacket of CW2 uses control information about CW1. Accordingly, an RV value indicated by the latest UL grant (UL grant for CW2 received at subframe n in the present embodiment) received for the disabled CW2 can be used as the RV information.

The UL scheduling information about the disabled CW2 can be determined according to the above-mentioned rule and CW2 can be retransmitted according to the determined UL scheduling information in step S1150.

In step S1160, the eNB may successfully decode CW2 transmitted in step S1150 and transmit an ACK signal for CW2 as a decoding result through a PHICH. Since the ACK signal for CW2 is received and a UL grant which indicates new transmission of CW2 is not present, the UE does not perform initial transmission/retransmission of CW2. In addition, the UE does not immediately flush the corresponding HARQ buffer even if the ACK signal for CW2 is received.

According to the present embodiment, when one of two CWs is instructed to be disabled after UL 2-CW transmission, a transmission scheme for the disabled CW can be clearly defined. That is, after successful transmission of an activated CW, the UE can perform retransmission of an disabled CW according to UL scheduling information determined by a predetermined rule without waiting for a UL grant for the disabled CW. For example, even if the UL grant for the disabled CW is not provided, the UE can determine the UL scheduling information on the basis of resource allocation, rank, MCS and precoding information of the latest UL grant and RV information of the latest UL grant for the disabled CW regardless of CWs. The UE can retransmit the disabled CW according to the UL scheduling information determined by the above-mentioned rule without waiting for the UL grant for the disabled CW. Accordingly, it is possible to clearly define the disabled CW transmission operation of the UE while reducing overhead of downlink control information.

While the embodiments of the present invention are described based on CWs, description based on CWs can be equally applied to description based on transport blocks since a single CW is mapped to a single transport block. The term 'data block' may be used as a representative term of CW or transport block.

Figure 12:
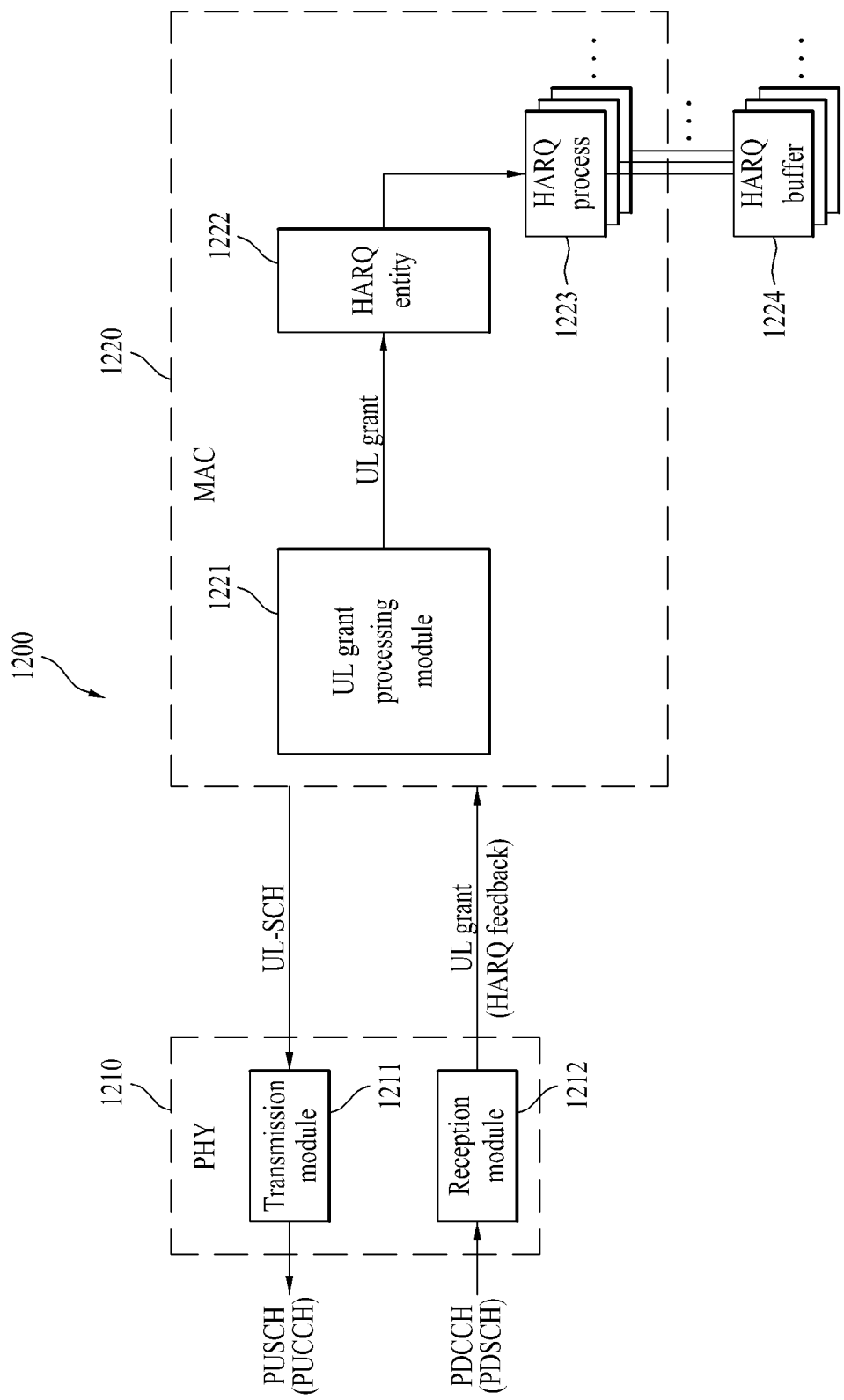
FIG. 12 is a block diagram of a UE device according to an embodiment of the present invention.

FIG. 12 is a block diagram of a UE device according to an embodiment of the present invention.

The UE device may include an antenna (not shown) for transmission and reception of signals, a memory (not shown) for storing data and information, and a processor 1200 for processing transmitted and received signals. FIG. 12 shows the internal configuration of the processor 1200 in association with FIGS. 1 to 11.

The processor 1200 may be divided into a physical layer module 1210 for transmitting/receiving physical signals to/from an eNB and a MAC layer module 1220 for connecting the physical layer module 1210 to a higher layer (not shown) and controlling signal transmission and reception of the physical layer module 1210.

Specifically, the physical layer module 12100 may include a transmission module 1211 for transmitting a UL signal to the eNB and a reception module 1212 for receiving a signal from the eNB. The transmission module 1211 is configured to perform uplink multi-CW transmission and can have the configuration of FIG. 6, for example.

The MAC layer module 1220 may include a processing module 1221 for processing a UL grant, a HARQ entity 1222 for managing a HARQ process, and a plurality of HARQ processes 1223. A UL grant is provided per CW. Up to two CWs can be transmitted in a TTI and each HARQ process can be related to each CW. The plurality of HARQ processes 1223 may include HARQ buffers 1224 respectively corresponding thereto. If the MAC layer module 1220 is designed to execute functions of the UL grant processing module 1221 shown in FIG. 12, it is not necessary to configure the UL grant processing module 1221 as a separate module.

A description will be given of an operation of the UE of transmitting an disabled CW in association with UL multi-CW transmission on the basis of the configuration of the UE device.

When the eNB transmits UL scheduling control information (i.e. a UL grant), the UE may receive the UL scheduling control information through the reception module 1212 of the physical layer module 1210. A first data block and/or a second data block may be initially transmitted or retransmitted to the eNB according to the UL scheduling control information through the transmission module 1211 of the physical layer module 1210 of the UE. Non-adaptive retransmission of the first data block and/or the second data block may be performed without using the UL scheduling control information.

The plurality of HARQ processes 1223 of the MAC layer module 1220 of the UE includes two HARQ processes (first and second HARQ processes) associated with a single subframe. The first HARQ process relates to transmission of the first data block and the second HARQ process relates to transmission of the second data block. That is, the MAC layer module 1220 may be configured to control the transmission module 1211 to transmit the first data block through the first HARQ process at a first subframe and to transmit the second data block through the second HARQ process at the first subframe.

The MAC layer module 1220 of the UE may receive the UL scheduling control information about the first data block, which is transmitted through the first HARQ process at the first subframe, at a second subframe through the reception module 1212. When an NDI of the UL scheduling control information about the first data block (or the first HARQ process) received at the second subframe through the reception module 1212 has a value that is not toggled as compared to previous transmission of the first HARQ process, retransmission of the first data block may be performed. That is, retransmission of the first data block can be performed at a third subframe through the transmission module 1211 on the basis of the UL scheduling information relating to the first HARQ process.

The physical layer module 1210 of the UE may be configured to transmit an ACK signal for the second data block to the MAC layer module 1220 upon receiving control information which indicates disabling of the second data block at the second subframe. Accordingly, the second HARQ process associated with the second data block of the MAC layer module 1220 can set HARQ feedback information about the second data block to an ACK state. Therefore, the MAC layer module 1220 can control retransmission of the second data block not to be performed until the UL scheduling control information about the second data block is received.

Specifically, when the UL scheduling control information about the second data block (or second HARQ process) is not received at the second subframe, the MAC layer module 1220 can control the transmission module to retransmit the second data block when HARQ feedback information about the second data block is NACK if the HARQ buffer of the second HARQ process is not empty. As described above, the second HARQ process associated with the second data block sets the HARQ feedback information about the second data block to ACK when disabling of the second data block is instructed, and thus the UE is in a waiting state without performing retransmission of the second data block until the UL scheduling control information about the second data block (or second HARQ process) is received.

Furthermore, when the UL scheduling control signal about the second data block (or second HARQ process) is received through the reception module after the third subframe, the MAC layer module 1220 of the UE may control the transmission module 1211 to perform initial transmission or retransmission of the second data block on the basis of the UL scheduling control information about the second data block.

While FIG. 12 illustrates the UE device as a UL transmitting side, the above description can be equally applied to a relay device as a UL transmitting side.

The embodiments of the present invention may be implemented by various means, for example, hardware, firmware, software, or combinations thereof.

When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

It is obvious to those skilled in the art that claims that are not explicitly cited in each other in the appended claims may be presented in combination as an exemplary embodiment of the present invention or included as a new claim by a subsequent amendment after the application is filed.

[Industrial Applicability]

The above-described embodiments of the present invention can be applied to various mobile communication systems.

The invention claimed is:

1. A method for performing uplink MIMO transmission, the method comprising:
   transmitting a first data block and a second data block at a first subframe through a first HARQ process and a second HARQ process, respectively;
   receiving, at a second subframe, uplink scheduling control information on the first data block and control information which indicates disabling of the second data block;
   setting a HARQ feedback information state on the second data block to an ACK state; and
   performing retransmission of the first data block at a third subframe on the basis of the uplink scheduling control information on the first data block,
   wherein retransmission of the second data block is not performed until uplink scheduling control information on the second data block is received, and
   wherein the HARQ feedback information state on the second data block is set to the ACK state regardless whether any HARQ feedback information is indicated or HARQ feedback information indicates NACK state or ACK state.

2. The method according to claim 1, wherein a new data indicator (NDI) of the uplink scheduling control information on the first data block received at the second subframe has a value that is not toggled as compared to previous transmission of the first HARQ process.

3. The method according to claim 1, further comprising:
   receiving uplink scheduling control information on the second data block after the third subframe; and
   performing retransmission of the second data block on the basis of the uplink scheduling control information on the second data block.

4. The method according to claim 1, wherein the uplink scheduling control information on the first data block and the uplink scheduling control information on the second data blocks are received through physical downlink control channels (PDCCHs), and the first and second data blocks are transmitted through physical uplink shared channels (PUSCHs).

5. The method according to claim 1, wherein the second subframe comes after four subframes from the first subframe and the third subframe comes after four subframes from the second subframe.

6. A UE for performing uplink MIMO transmission, the UE comprising:
  a physical layer module including a reception module for receiving uplink scheduling control information from an eNB and a transmission module for performing initial transmission or retransmission of a first data block and a second data block; and
  a medium access control (MAC) layer module including a plurality of HARQ processes including a HARQ entity, a first HARQ process and a second HARQ process which are managed by the HARQ entity,
  wherein the MAC layer module is configured to control the transmission module to transmit the first data block and the second data block at a first subframe through the first HARQ process and the second HARQ process, respectively, and to control the transmission module to perform retransmission of the first data block at a third subframe on the basis of uplink scheduling control information on the first data block when the uplink scheduling control information on the first data block is received at a second subframe through the reception module,
  wherein the physical layer module transmits an acknowledgement (ACK) signal for the second data block to the MAC layer module when control information which indicates disabling of the second data block is received at the second subframe,
  wherein the MAC layer module sets a HARQ feedback information state on the second data block to an ACK state and controls retransmission of the second data block not to be performed until uplink scheduling control information on the second data block is received, and
  wherein the HARQ feedback information state on the second data block is set to the ACK state regardless whether any HARQ feedback information is indicated or HARQ feedback information indicates NACK state or ACK state.

7. The UE according to claim 6, wherein a new data indicator (NDI) of the uplink scheduling control information on the first data block received at the second subframe has a value that is not toggled as compared to previous transmission of the first HARQ process.

8. The UE according to claim 6, wherein, when uplink scheduling control information on the second data block is received after the third subframe, the MAC layer module controls the transmission module to perform retransmission of the second data block on the basis of the uplink scheduling control information on the second data block.

9. The UE according to claim 6, wherein the uplink scheduling control information on the first data block and the uplink scheduling control information on the second data blocks are received through physical downlink control channels (PDCCHs), and the first and second data blocks are transmitted through physical uplink shared channels (PUSCHs).

10. The UE according to claim 6, wherein the second subframe comes after four subframes from the first subframe and the third subframe comes after four subframes from the second subframe.

* * * * *